US008537216B2

(12) United States Patent
Guertler

(10) Patent No.: US 8,537,216 B2
(45) Date of Patent: Sep. 17, 2013

(54) LEVELING APPARATUS AND METHOD

(75) Inventor: Klaus Guertler, Zoellnitz (DE)

(73) Assignee: TRIMBLE Jena GmbH, Jena (DE)

( * ) Notice: Subject to any disclaimer, the term of this patent is extended or adjusted under 35 U.S.C. 154(b) by 796 days.

(21) Appl. No.: 12/623,272

(22) Filed: Nov. 20, 2009

(65) Prior Publication Data

US 2010/0134617 A1    Jun. 3, 2010

Related U.S. Application Data

(63) Continuation of application No. PCT/EP2007/004593, filed on May 23, 2007.

(51) Int. Cl.
*H04N 7/18* (2006.01)

(52) U.S. Cl.
USPC .............................. 348/135; 33/290

(58) Field of Classification Search
USPC ................... 348/135; 33/285, 290
See application file for complete search history.

(56) References Cited

U.S. PATENT DOCUMENTS

| | | | |
|---|---|---|---|
| 4,717,251 A | 1/1988 | Wells et al. | |
| 4,723,297 A | 2/1988 | Postl | |
| 4,781,463 A | 11/1988 | Rosen et al. | |
| 5,547,879 A | 8/1996 | Dierschke et al. | |
| 5,572,009 A | 11/1996 | Guertler | |
| 5,841,134 A * | 11/1998 | Burgschat et al. | 250/237 G |
| 6,076,267 A | 6/2000 | Gotoh | |
| 6,108,920 A | 8/2000 | Kinoshita | |
| 6,144,021 A * | 11/2000 | Suzuki | 250/201.2 |
| 6,237,235 B1 | 5/2001 | Feist et al. | |
| 6,332,574 B1 | 12/2001 | Shigekusa et al. | |
| 6,525,311 B1 * | 2/2003 | Burgschat | 250/237 G |
| 6,549,648 B1 | 4/2003 | Rinn | |
| 6,671,058 B1 | 12/2003 | Braunecker et al. | |
| 6,731,329 B1 | 5/2004 | Feist et al. | |
| 6,747,262 B2 * | 6/2004 | Willhelm | 250/208.2 |
| 7,200,945 B2 * | 4/2007 | Endo | 33/290 |
| 7,411,593 B2 * | 8/2008 | Prakash et al. | 345/611 |
| 2004/0031904 A1 | 2/2004 | Chen | |
| 2007/0289152 A1 * | 12/2007 | Zeng et al. | 33/293 |

FOREIGN PATENT DOCUMENTS

| | | |
|---|---|---|
| DE | 197 06 970 A1 | 8/1997 |
| DE | 196 10 941 A1 | 9/1997 |
| DE | 198 25 829 A1 | 12/1999 |
| EP | 0 133 835 A2 | 3/1985 |
| EP | 0 176 910 A1 | 4/1985 |
| EP | 0 297 601 A2 | 1/1989 |
| EP | 0 709 652 A1 | 5/1996 |
| WO | WO 2008/014813 A1 | 8/1997 |

OTHER PUBLICATIONS

Von Wieland Feist, et al., "Die neuen Digitalnivelliere DiNi10 und DiNi20," *VR Vermessungswesen und Raumordnung*, Apr. 1995; vol. 57, Issue 2, pp. 64-78(English translation included).

* cited by examiner

*Primary Examiner* — Mehrdad Dastouri
*Assistant Examiner* — Jeremaiah C Hallenbeck-Huber
(74) *Attorney, Agent, or Firm* — Kilpatrick Townsend & Stockton LLP

(57) ABSTRACT

A leveling apparatus for optically detecting a height difference relative to a leveling staff includes an objective, a two-dimensional detector, a mount for rotating both the objective and the detector about a fixed vertical axis of the apparatus, and a processor. The detector is arranged such that its rows are inclined to an image of a vertical axis of the object by an acute angle. A method of detecting a height difference of an apparatus relative to a leveling staff includes imaging the leveling staff onto an array of detectors such that the image of a vertical axis of the staff is inclined to detector rows at an acute angle.

29 Claims, 9 Drawing Sheets secondary pixel lines    secondary pixel lines primary pixel line secondary pixel lines → ← secondary pixel lines
↑
primary pixel line series of amplitudes of the code =

$$P0,0 \,;\, \frac{P1,0+P0,1}{2} \,;\, \frac{P0,2+P1,1+P2,0}{3} \,;\, \frac{P2,1+P1,2}{2} \,;\, \frac{P1,3+P2,2+P3,1}{3} \,;\, \ldots$$

formula1

LEVELING APPARATUS AND METHOD

CROSS-REFERENCES TO RELATED APPLICATIONS

This application claims priority to and is a continuation of International Patent Application No. PCT/EP2007/004593, filed on May 23, 2007, the disclosure of which is hereby incorporated by reference in its entirety for all purposes.

BACKGROUND OF THE INVENTION

The present invention relates to the field of optical measurement and especially to geodetic measurement instruments. In particular, the invention relates to a leveling apparatus for measuring a height difference between the leveling apparatus and a leveling staff; to the use of the leveling apparatus in a geodetic measurement; and to a method of optically detecting a an object's vertical position.

A leveling apparatus is a special geodetic measurement instrument for optically measuring a height difference relative to a leveling staff, and thus a height difference between the instrument and the leveling staff.

In general, the leveling apparatus comprises at least a telescope including an optical detector, an optical system for generating an image on the optical detector and a controller. The controller is configured to receive an output signal from said optical detector and to output a leveling signal representing a detected height difference based on the output signal.

In this respect the use of a leveling staff separate from the apparatus is necessary to conduct a measurement using a leveling apparatus. A scale (measure) indicating a height relative to ground is provided on a surface of the leveling staff in the direction of elongation of the leveling staff (e.g. in the form of a coded pattern).

During measurement, the leveling staff is brought in line with an optical axis of the optical system. At this stage, the optical axis of the optical system has to be arranged in a horizontal plane. After alignment, the optical system generates an image of at least a part of the scale provided on the measuring staff on the optical detector. The image is analyzed to read the scale of the leveling staff in the middle of the image. The corresponding value is output as being the height difference between the apparatus and the leveling staff.

The above method and apparatus is explained in more detail in the essay "Die neuen Digitalnivelliere DiNi 10 und DiNi20" of Wieland Feist, Klaus Gürtler, Thomas Marold and Holger Rosenkranz, published in April 1995 in volume 57, issue 2 of the journal "VR Vermessungswesen und Raumordnung". This journal is issued by Hanns J. Meckenstock, Domagkweg 90, D-42109 Wuppertal, Germany. The content of this essay is herewith incorporated by reference.

Another leveling apparatus is known from co-pending application PCT/EP2006/009823 from the same applicant. The entire contents of this document are incorporated herein by reference.

Examples of measurement staffs and methods of analyzing an image imaging these measurement staffs are disclosed in documents DE 197 06 970 A1 and U.S. Pat. No. 5,572,009. The entire contents of the latter document are incorporated herein by reference to become part of the present disclosure.

Normally any bar code on a leveling staff can be scanned with a linear image sensor. Newer area (i.e., two-dimensional) image sensors, especially CMOS-sensors, are more circulated on the market of electronic devices and have a lot of advantages against linear image sensors in terms of e.g. cost, speed, and integrated post processing.

However, since area image sensors usually have smaller pixels they also provide a smaller line/column length which can result in a shorter segment of code which can be read.

SUMMARY OF THE INVENTION

The present invention has been accomplished taking the above problems into consideration.

In some embodiments there is an improvement in accuracy by reading out and averaging of more than one line of pixels, namely, additionally at least one secondary line. Also, errors caused by inhomogeneous color or reflection properties of the bar code-bearing object can be minimized. Still further, a system which is automatically searching for the bar code may be provided with a larger recognition range, depending on the distance between the object and the objective.

Exemplary embodiments of the present invention describe the use in a leveling device of an area image sensor where the installation is done in such a way that the lines (rows) are in an acute angle to the vertical reading direction of the bar code on the object.

In exemplary embodiments of the present invention, the segment of code which can be scanned is larger, preferably by a factor of at least up to $\sqrt{2}$, and the resolution can be increased, preferably also by a factor of at least up to $\sqrt{2}$, by reading of the secondary (neighboring) pixels, too, which pixels are interspersed with those of the primary pixel line. Note that therefore, a fixed magnification can be employed; this is advantageous because a variable magnification would make it more difficult to measure the distance of the object.

Embodiments of the present invention provide a leveling apparatus that has a high degree of resolution and is capable of detecting a bar code with high accuracy.

According to embodiments of the present invention, a leveling apparatus for optically measuring a height difference relative to a leveling staff comprises an objective having an optical axis and an object plane intersecting the optical axis on an object side thereof, in which object plane the object (e.g., the leveling staff) can be placed, such that the objective images the object onto an image plane of the objective, the image plane intersecting the optical axis on an image side thereof. The apparatus further comprises an image receiving unit comprising plural rows of detector elements, the plural rows being arranged to form a two-dimensional detector array, the detectors for outputting signals representing an amount of light incident on the detectors, wherein the image receiving unit is arranged in the image plane. Further, the apparatus comprises a processor receiving the output signals, and a mount for moving the objective around a vertical axis. The detector rows are arranged at an acute angle (an angle larger than 0° and smaller than 90°) with respect to an image of a vertical axis of the object.

In this respect the orientation of the detector rows at an acute angle to that direction in the image plane which corresponds to a vertical direction of the object, i.e. the leveling staff, and therefore a horizontal orientation of the bar code pattern, results in several detector rows to provide somewhat differing information on the position of the bar code pattern. This differing information can then be computationally combined in a processor by using a suitable weighting scheme, so as to provide improved resolution.

According to an embodiment the acute angle is between 10° and 80°, or even between 32° and 58°; according to another embodiment, the acute angle is between 40° and 50°, which is particularly useful if the number of detector rows equals or about equals the number of detectors per row.

An array of light sensitive elements of a two-dimensional sensor may comprise more than 100 and in particular more than 200 and in particular more than 400 light sensitive elements in row direction and more than 100 and in particular more than 200 and in particular more than 400 light sensitive elements in cross row direction. A typical example of a suitable two-dimensional sensor might comprise 640 elements in row direction and 480 elements in cross row direction. In general, there are at least three or more rows. While a square or rectangular row arrangement is suitable, plural short rows offset against one another may also be used. In this arrangement, there are typically fewer detectors per row than there are rows, while the row offset is less than that number of detectors per row, and e.g. is 1. In this case, the rows near the edge of the two-dimensional detector array may be shorter than centrally arranged rows, which may be the longest.

According to an embodiment, at least one of said optical detectors is a Charge-Coupled Device (CCD) or CMOS image sensor. In the context of this application, a detector row comprises plural detectors in a side-on arrangement. If the detector is a CCD, the readout direction defines the rows.

According to an example, the leveling staff has a pattern of alternating light reflectivity arranged in the direction of elongation of the leveling staff and the controller is configured to generate said leveling signal representing a detected height difference by analyzing the respective pattern of the leveling staff contained in the output signal of the detector.

This pattern may directly indicate height information in coded form. Thus, the leveling staff and not the leveling apparatus itself represents the material measure for the measurement. The pattern contained in the output signal can be analyzed to measure the relative height difference between the apparatus and the leveling staff.

Other examples relate to the use of the device as described above in a geodetic measurement.

Still further examples relate to a method of detecting a height difference comprising imaging of an object onto a detector such that a vertical axis of the object is inclined to a row direction of a detector at an acute angle, and to calculate weighted combinations of detector output signals of the detectors of adjacent rows.

The embodiments and aspects described above may be combined with one another.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
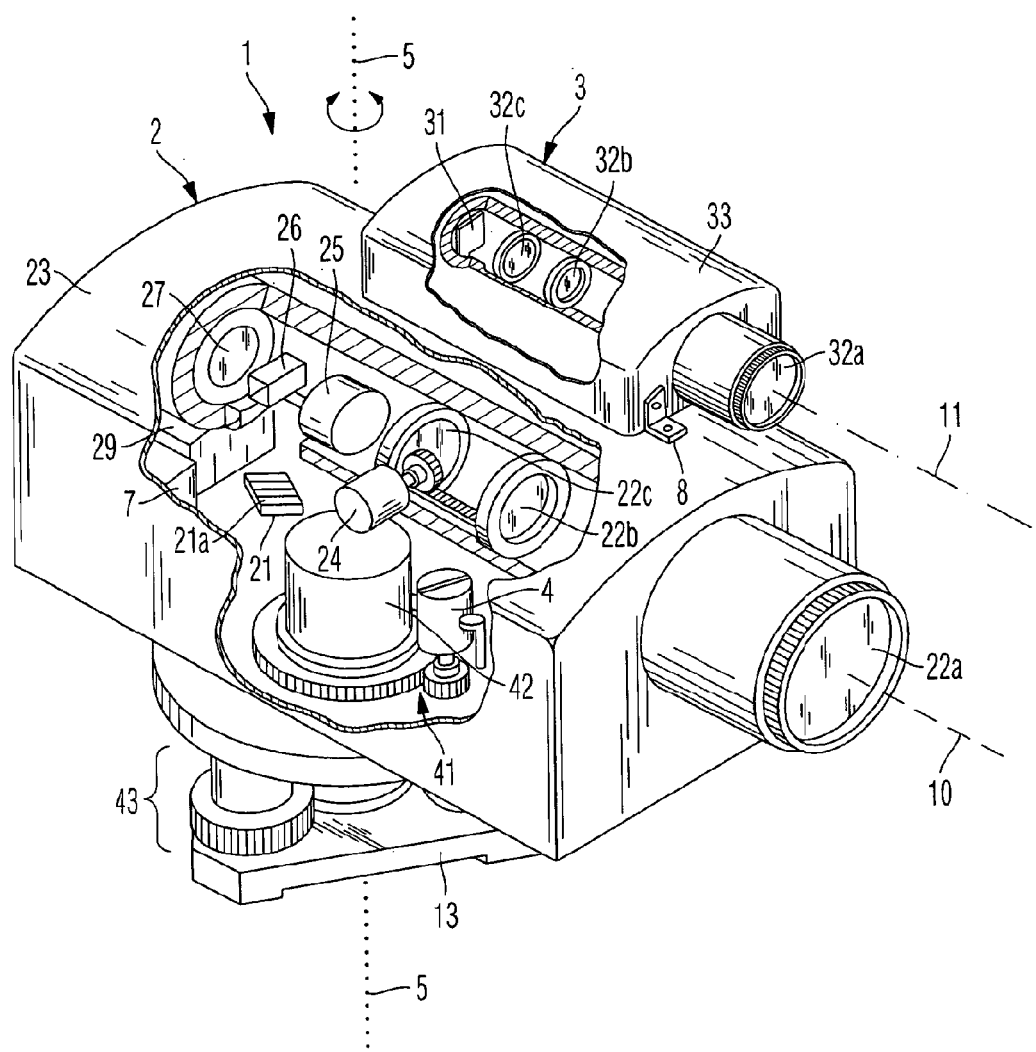
FIG. 1 is a perspective view of a leveling apparatus according to an embodiment of the present invention.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

In the following, an embodiment of an leveling apparatus is described with reference to the accompanying Figures.

As best shown in FIG. 1, the inventive leveling apparatus 1 basically consists of a telescope 2 having an objective 22a, a two-dimensional detector 21, a pivoting stepper motor, a mount 13 and a processor 7. In the present embodiment, the detector has a rectangular or square array of several rows of individual elements.

The telescope 2 basically consists of an optical system 22a, 22b, 22c, a rectangular or square CCD-detector 21 constituting an optical detector, a beam splitter 26, an eyepiece 27 and a focusing stepper motor 24. The optical system consists of plural optical lenses 22a, 22b and 22c and a compensator 25 that define an object side part of the optical axis 10 of the optical system. The optional compensator 25 is an automatic mechanism for maintaining the optical axis 10 horizontal and is arranged in an image side part of the optical axis. The first lens 22a on the object side is the objective lens, while the following lenses 22b and 22c form imaging optics.

Figure 2A:
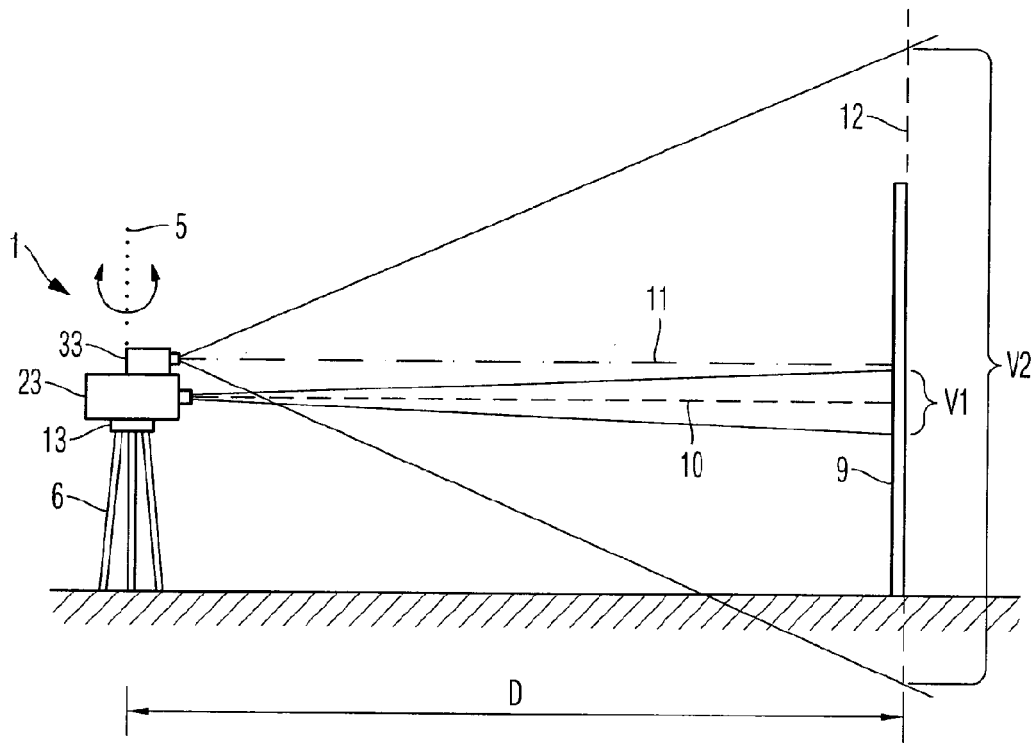
FIG. 2A is a side view illustration of a leveling apparatus in operation.
Figure 2B:
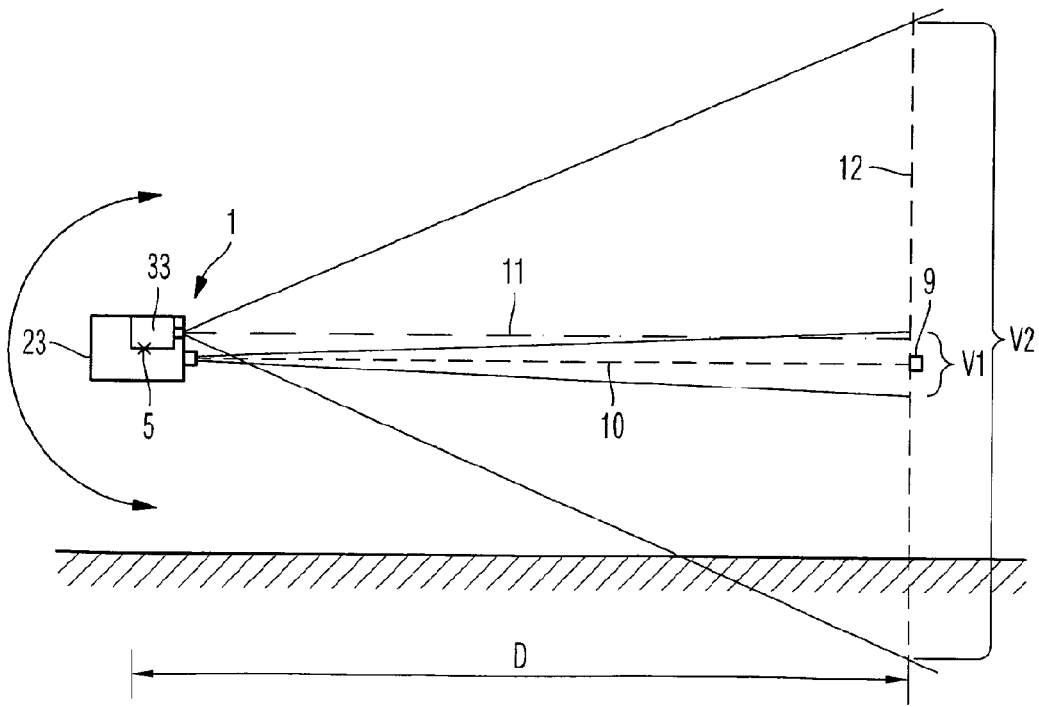
FIG. 2B is a top view illustration of a leveling apparatus in operation.

By using the beam splitter 26, the optical lenses 22a, 22b and 22c are adapted to generate an image on both the CCD-detector 21 and for a user (not shown) looking into the eyepiece 27 from a field of view V1. The focusing stepper motor 24 is adapted to adjust a distance D between the optical system and the object plane 12 imaged by the optical lenses 22a, 22b and 22c on the CCD-detector 21 by adjusting a gap G between the lenses 22b and 22c of the first optical system 28. This distance D is shown in FIGS. 2A and 2B.

The optional eyepiece 27 may be used to monitor the alignment of the optical axis 10 of the telescope 2 of the leveling apparatus 1 with respect to the leveling staff 9.

The pivoting stepper motor 4 and most parts of the telescope 2 (the optical lenses 22a, 22b and 22c, the compensator 25, the beam splitter 26, the CCD-detector 21, the focusing stepper motor 24 and part of the eyepiece 27) are arranged in a housing 23 of the telescope 2.

The housing 23 of the telescope 2 is attached via a pivot 42 to a base plate 13. As shown in FIG. 2A, the base plate 13 together with a tripod 6 forms a tribrach as a mount.

The optional wide-angle camera 3 contains plural optical lenses 32a, 32b and 32c forming a second optical system 38 with an array CCD-detector 31. The optical lenses 32*a*, 32*b* and 32*c* define an optical axis 11 of the second optical system 38 and are adapted to generate a two-dimensional image on the array CCD-detector 31 from a field of view V2.

Figure 4:
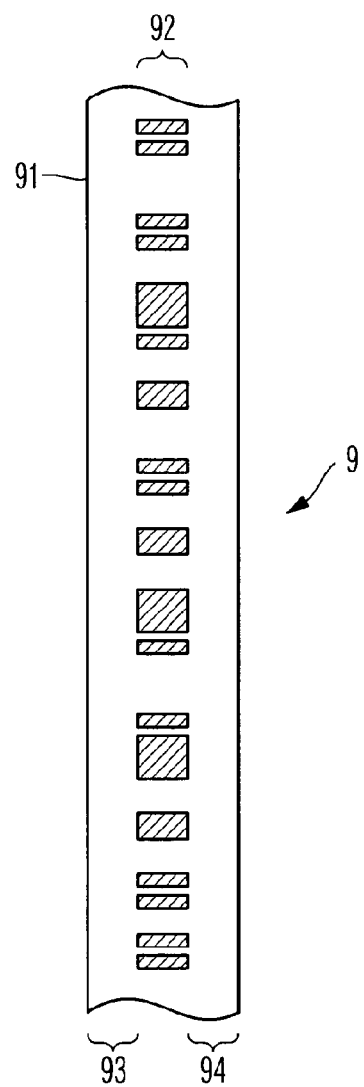
FIG. 4 shows a section of a leveling staff that may be used together with the leveling apparatus according to the present invention.

As is shown in FIG. 4, the leveling staff 9 consists of a shank 91 on which a scale 92 in the form of a pattern of alternating light reflectivity is provided. The scale 92 is arranged on the shank 91 in a direction of elongation of the leveling staff 9. On the left and right sides of the scale 92, border portions 93, 94 are provided.

Figure 5:
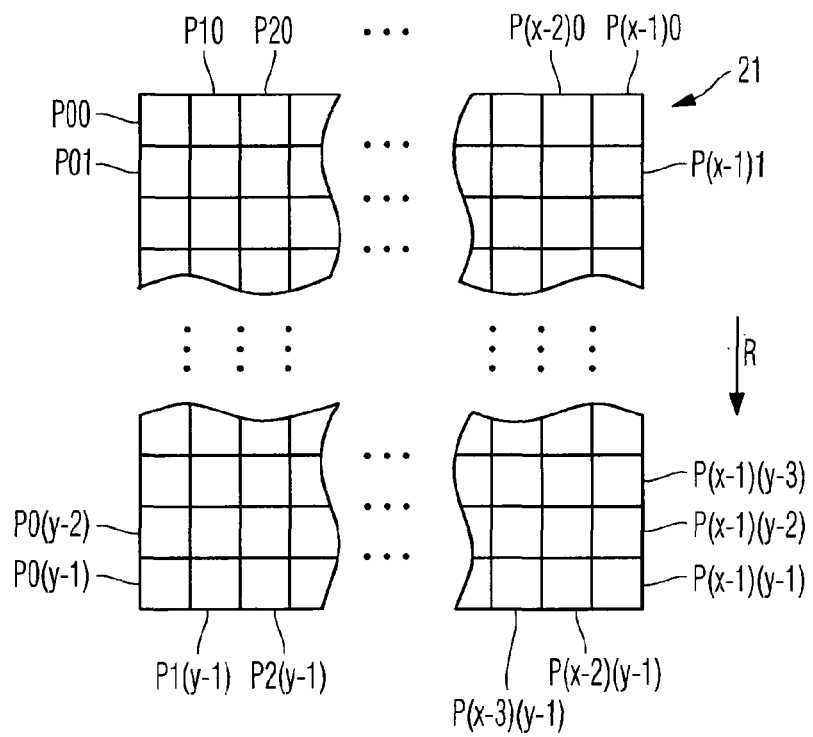
FIG. 5 schematically shows a detector array that may be used with the inventive leveling apparatus.

As it is best shown in FIG. 5, the CCD-detector 21 is a two-dimensional sensor preferably comprising more than 400 light sensitive elements (pixel) P00–P(x–1)(y–1) in both row direction, and cross row direction. In one embodiment, the number of pixels P00–P0(y–1), P10–P1(y–1), P20–P2(y–1), . . . , P(x–2)0–P(x–2)(y–1), P(x–1)0–P(x–1)(y–1) of each row 21*a* in row direction is 640. Thus, the wildcard character "y" is 640. The number of pixels P00–P(x–1)0, P01–P(x–1)1, . . . , P0(y–2)–P(x–1)(y–2), P0(y–1)–P(x–1)(y–1) in the cross row direction is 480. Thus, the wildcard character "x" is 480.

The array CCD-detector 31 and the optical lenses 32*a*, 32*b* and 32*c* are mounted in a housing 33. The housing 33 of the wide-angle camera 3 is fixed to the housing 23 of the telescope 2 via a bracket 8. The bracket 8 allows some adjustment of the both housings 23 and 33 (and thus of the telescope 2 and the wide-angle camera 3) relative to each other. During operation, the orientation of the optical axis 11 of the wide-angle camera 3 is maintained constant with respect to the optical axis 10 of the telescope 2.

The telescope 2 and the wide-angle camera 3 can be rotated about the pivot 42 by using the pivoting stepper motor 4 and a gear system 41 (that is also contained in the housing 23 of the telescope 3) around a fixed vertical axis 5. In consequence, both the optical axis 10 of the telescope 2 and the optical axis 11 of the wide-angle camera 3 can be rotated in a respective horizontal plane (not shown). Note, however, that it is not always necessary that the optical axis 10 is precisely horizontal; rather, in some situations it suffices if the optical axis is inclined at an angle to the horizontal plane, which inclination angle may be measured by a clinometer or tilt sensor. E.g., if the distance of the object is also measured, the height of the object relative to the apparatus may be deduced.

In the present embodiment, the microcomputer 7 is also provided inside the housing 23 of the telescope 3. Alternatively, the microcomputer might be provided in the base plate 13, for example.

Figure 3:
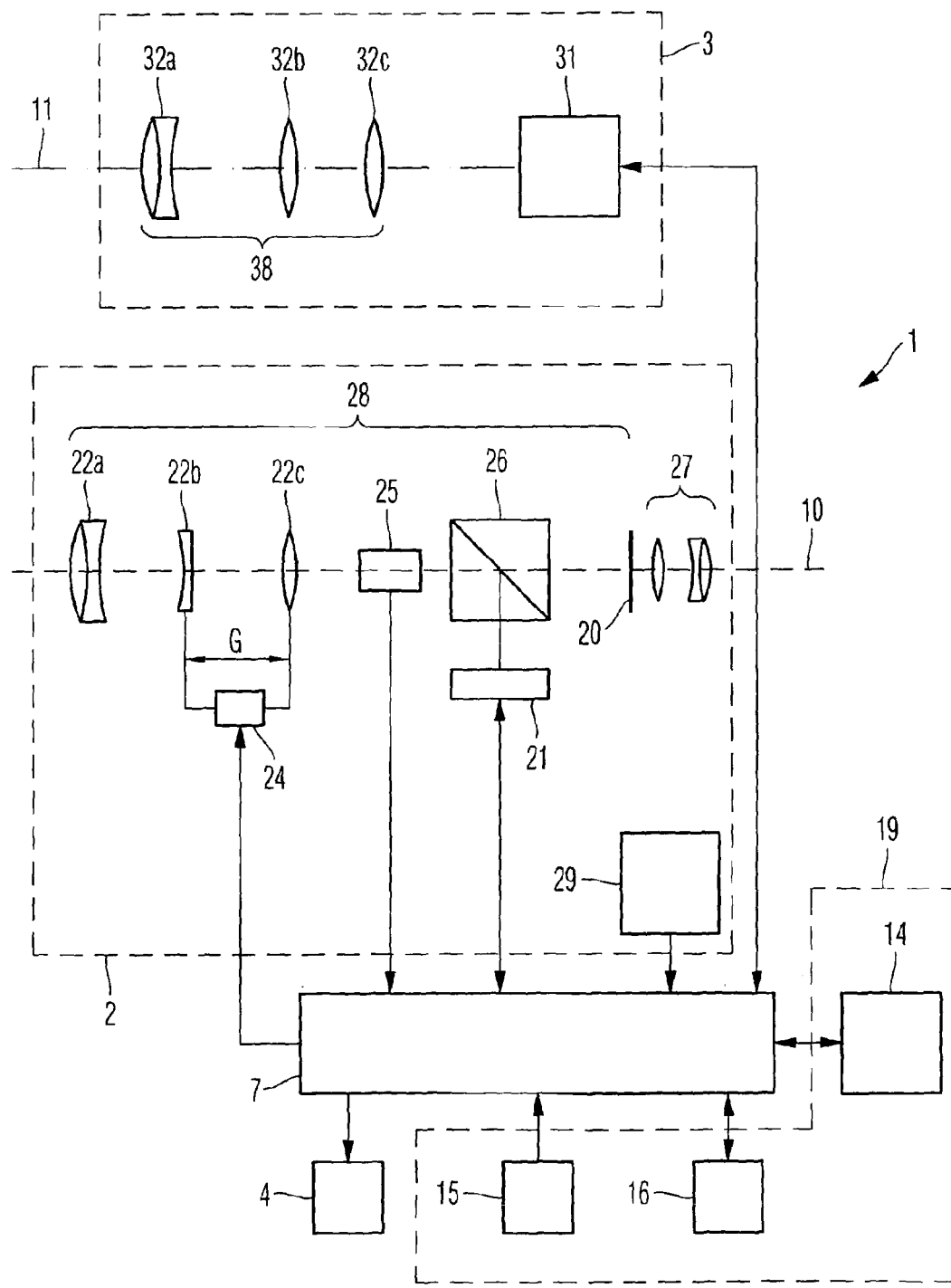
FIG. 3 is a block diagram showing the interconnection of basic parts of the leveling apparatus of FIG. 1.

The microcomputer 7 is connected to the two-dimensional detector 21, the compensator 25 and the focusing stepper motor 24 of the telescope 2, the array CCD-detector 31 of the camera 7, the pivoting stepper motor 4, a display 14, a user interface 15 and a memory 16 of the auxiliary means 19 (see FIG. 3). The computer may have several processors.

In the following, the function of the leveling apparatus 1 will be briefly described.

Figure 6:
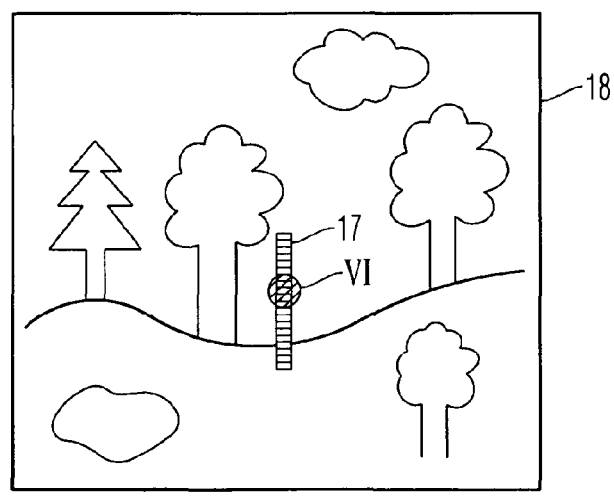
FIG. 6 schematically shows an image that might be generated by the leveling apparatus.

At the beginning of a measurement operation that might be triggered by a user via the user interface 15, the microcomputer 7 controls the pivoting stepper motor 4 such that the telescope 2 is rotated about the vertical axis 5. In the meantime, the microcomputer 7 receives a picture signal (second output signal) representing a two-dimensional image 18 from the array CCD-sensor 31. The rotation of the telescope 2 and the camera 3 is maintained until the microcomputer 7 identifies a representation 17 of a leveling staff 9 in the picture signal. Such a representation 17 in a two dimensional image 18 is shown in FIG. 6.

Based on the identified representation 17 of the leveling staff 9, the microcomputer 7 controls the pivoting stepper motor 4 such that the optical axis 10 of the first optical system 28 of the telescope 2 is automatically aligned with the identified representation 17 of the leveling staff 9 by rotation of both the telescope 2 and the camera 3.

In more detail, the microcomputer 7 determines a position of the identified representation 17 in the two-dimensional image 18 represented by the picture signal received from the camera 3. By considering a dependency of the optical axis 10 and 11 of the telescope 2 and the camera 3 relative to one another, it can be defined which area of the two-dimensional image 18 approximately corresponds to the optical axis 10 of the telescope 2. Thus, the pivoting stepper motor 4 is actuated by the microcomputer 7 until the identified representation 17 of the leveling staff 9 is arranged in this area.

In the above embodiment, the microcomputer 7 identifies the representation 17 of the leveling staff 9 in the picture signal of the array CCD-detector 31 by conducting picture analysis in the two dimensional image 18 represented by the picture signal.

Additionally or alternatively, the microcomputer 7 might identify the representation 17 of the leveling staff 9 directly in the picture signal by comparing the picture signal with a first preset pattern signal that is stored in a memory 16 connected to the micro-computer 7. Further, alternatively or additionally, the microcomputer 7 may identify the representation 17 of the leveling staff 9 by detecting a characteristic color preset for the respective leveling staff 9 in the picture signal. A plurality of characteristic colors preset for certain leveling staffs 9 might be stored in the memory 16. To facilitate the identification of the leveling staff 9, the user might select the characteristics of the actual leveling staff from plural characteristics of leveling staffs stored in the memory 16.

Moreover, the border areas 93, 94 of the shaft 91 of the leveling staff 9 are shown as vertical lines to the array CCD-detector 31 if the leveling staff 9 is in the field of view V2 of the second optical system 38 of the wide-angle camera 3. Thus, according to a further embodiment, the leveling staff 9 is detected in the picture signal by using a "Hough-transformation". Such an algorithm can extract or identify a vertical geometry under leveling conditions.

The rotation axis 5 of the telescope 2 and the optical axis 10 of the telescope 2 do not necessarily have to intersect. Thus, an offset of the optical axis 10 of the telescope 2 with respect to the vertical rotation axis 5 may be automatically taken into account by the microprocessor 7 when aligning the optical axis 10 of the telescope 2 with the leveling staff 9.

Further to aligning the optical axis 10 of the optical system of the telescope 2 with the leveling staff 9, the microcomputer 7 of the above described leveling apparatus 1 is adapted to control the focusing stepper motor 24 provided in the telescope 2.

In this respect, the leveling apparatus 1 automatically detects a distance between the leveling apparatus 1 and the leveling staff 9 by comparing a length or width of the identified representation 17 of the leveling staff 9 in the picture signal of the camera 3 with a preset length or width value for the respective leveling staff 9 that is stored in the memory 16. Based on the detected distance, the microcomputer 7 controls the focusing stepper motor 24 such that the distance D between the optical system and the object plane 12 automatically is adjusted to the detected distance between the leveling apparatus 1 and the leveling staff 9. Thus, control of the focusing stepper motor 24 is performed by the microcomputer 7 based on the identified representation 17 of the leveling staff 9 in the picture signal received from the array CCD-detector 31 of the camera 3.

By controlling the focusing stepper motor 24 based on the picture signal of the camera 3, the focus of the optical system can be automatically pre-adjusted to a distance where the leveling staff 9 is roughly expected.

In the present embodiment, the shaded areas in FIG. 4, and especially the border portions 93 and 94 are of a lurid yellow color, which might be called "signal color". This color of high reflectivity is usually not found in natural environments. Thus, this color can be used by the microcomputer 7 to identify the leveling staff 9 in the picture signal of the second optical system 38 of the camera 3 as described above.

The microcomputer 7 generates the leveling signal representing a detected height difference between the leveling staff 9 and the electronic leveling apparatus 1 by analyzing the pattern of alternating light reflectivity that is contained in the output signal of the optical detector 21 if the leveling staff 9 is in the field of view V1 of the optical system of the telescope 2. The concrete generation of the leveling signal based on the pattern contained in the output signal to output a height of the electronic leveling apparatus 1 with respect to the leveling staff 9 is well known from the prior art documents cited in the introductory pages of this application.

The leveling apparatus does not necessarily have to comprise all elements of the above-described preferred embodiment. Moreover, additional elements like e.g. a power supply (e.g. a battery) or e.g. a remote control unit might be provided. The display 14 either might be integrated into the housing 23 of the telescope 2 or the housing 33 of the camera 3. Alternatively even a separate display means like a PDA (personal digital assistant) or PC (personal computer) might be used.

Figure 7:
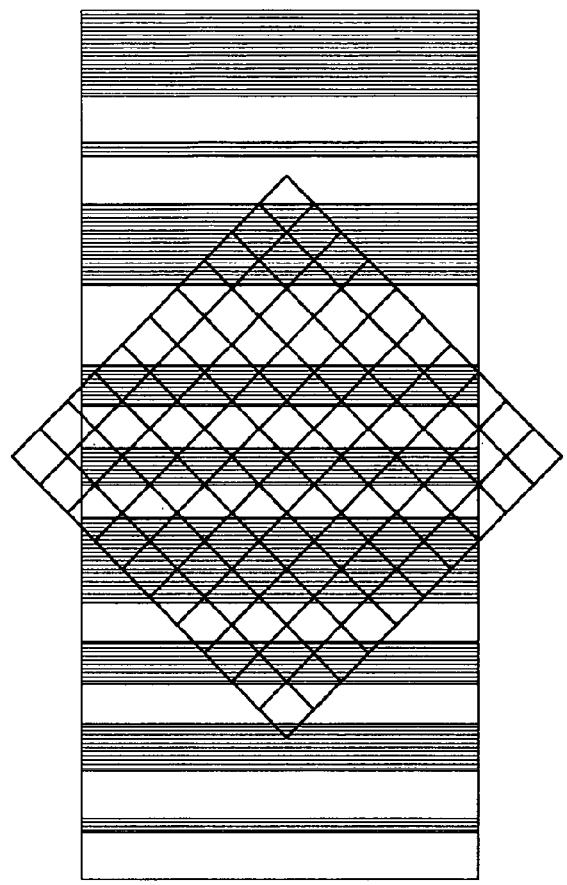
FIG. 7 shows an arrangement of the image of a bar code of a leveling staff onto a square detector array according to the invention.
Figure 8:
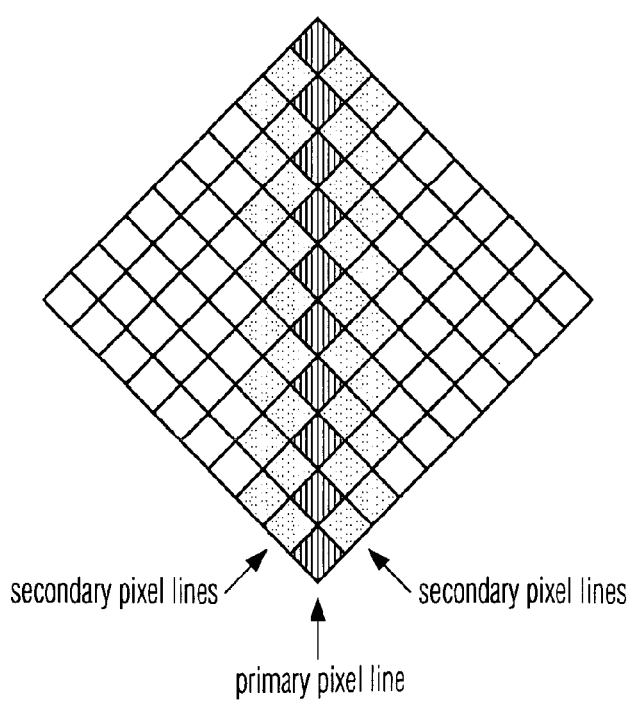
FIG. 8 shows primary and secondary pixel lines of the detector array of FIG. 7.
Figure 9:
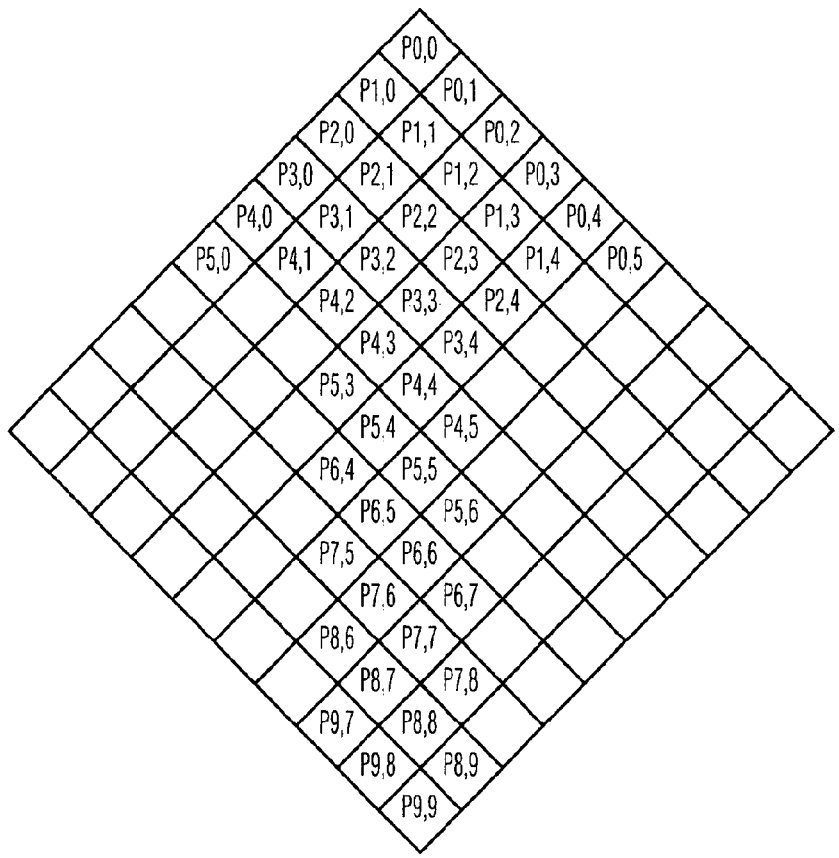
FIG. 9 shows an exemplary enumeration of detectors of a square 10×10 detector array according to the invention, and a weighting scheme.

According to the example shown in FIG. 7, the bar code of a leveling staff is imaged onto a 10×10 square detector array such that the vertical axis of the staff is aligned with the diagonal of the detector array, i.e. the detector rows form an angle φ of 45° (or within less than 5° of 45°) with the image of the vertical object axis. As shown in FIG. 8, the detectors intersected by the diagonal form a primary pixel line, while the detector adjacent the primary pixel line and the detectors laterally touching the detectors of the primary pixel line corner-on, which have a distance from the diagonal which is but half their (diagonal) size, form secondary pixel lines, two on either side of the primary pixel line. In this context, "lines" of detectors are understood as being arranged corner-to-corner. From FIG. 9, a weighting scheme of these pixel lines is evident: According to the numbering as shown therein, the primary pixel line has pixels enumerated by Px,x; the first secondary pixel line has pixels enumerated Px,x±1; and the next secondary pixel line has pixels enumerated Px,x±2. According to formula 1, the weighting scheme is such that where x+y is even (but neither 0 nor xmax+ymax), the weighted sum (Px,x+Px,x+2+Px,x 2)/3 is calculated, and where x+y is odd, the weighted sum (Px,x+1+Px,x−1)/2 is calculated. Where averaging is not desired, the diagonal values Px,x can be used directly without weighting. Where x+y is 0, the value P0,0 is used, and likewise where x is xmax and y is ymax, Pxmax,ymax is used without weighting (xmax and ymax denoting the maximum possible values for x and y, namely the number of rows, and the number of detectors in the longest row, respectively). Note that where such a scheme is to be used, the detector array need only have the primary and first and, optionally, second secondary pixel lines. However, the detector will be more versatile if more pixel lines are present and can be included in an extended weighting scheme if need be.

Figure 10:
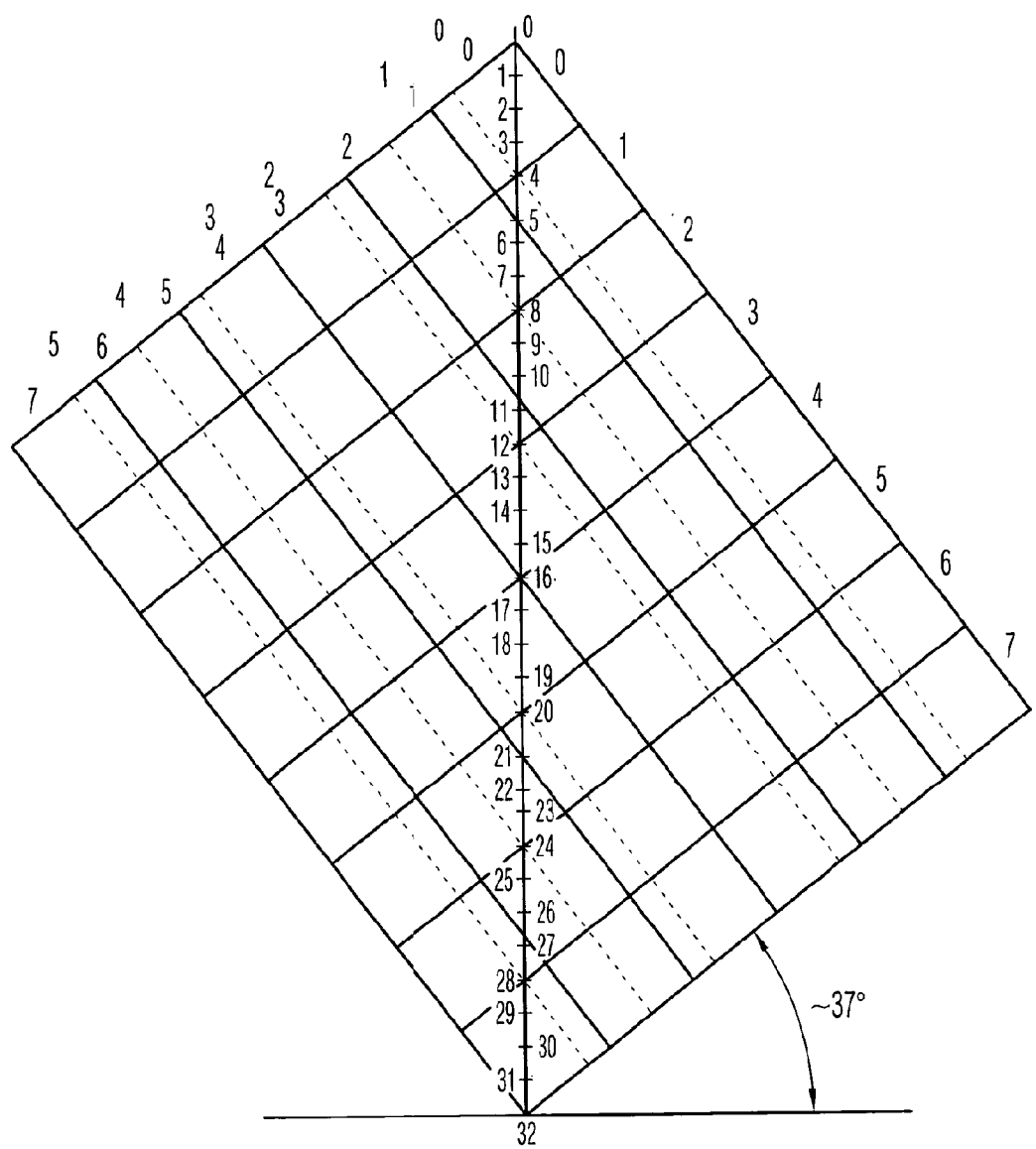
FIG. 10 shows an exemplary enumeration of rows and columns of detectors of a rectangular 8×6 detector array according to the invention.

According to FIG. 10, a rectangular detector array with 6 lines of eight real pixels each is used (outer numbering). Note that this selection is for illustration purposes only, as actual detectors will have larger numbers of rows and columns. The physical array is divided into an 8×8 "virtual pixel" array (inner numbering in FIG. 10). It may be noted that the virtual pixels have different overlaps with the actual pixels. In particular, to each virtual pixel area, one or several actual pixel areas contribute. E.g., the virtual pixel V0,0 has only one contributor, namely actual pixel P0,0, and the overlap is 75% of the area of that actual pixel. On the other hand, the virtual pixel V1,1 has two contributors P0,1 and P1,1 with overlap areas 25% and 50%, respectively. Generally, for a ratio of the number of rows to the number of detectors per row of 3:4, there will be one factor of 75% if (s mod 4) is 0 or 3; and there will be factors of 25% and 50% if (s mod 4) is 1 or 2. In particular, let $Ap_{y,x}$ be the original output signal of a pixel at position y,x; let $Av_{s,r}$ be the calculated value of a virtual pixel at position s,r; and let INT(3·s/4)=y and r=x.

Then, if (s mod 4) is 0 or 3, $AV_{s,r}=0.75 \cdot AP_{y,x}$;

if (s mod 4) is 1, $AV_{s,r}=0.25 \cdot AP_{y,x}+0.5 \cdot Ap_{y+i,x}$; and if (s mod 4) is 2, $AV_{s,r}=0.5 \cdot AP_{y,x}+0.25 \cdot AP_{y,x}$.

In this manner, a square number of virtual pixels is defined. Of course, for other ratios of the number of detectors per row and the number of rows, the coefficients should be adjusted accordingly, such that a square number of virtual pixels results. Also, in such a case a different angle φ would result: While this angle is close to 37° (or 53°) for a 3:4 array (arctan(3/4)≈37° and arctan(4/3)≈53°), other angles will be preferable for other aspect ratios, such as about 34° (or about 56°) for an aspect ratio of 2:3, which is also quite common. Note that where the rows define the longer dimension, an angle of less than 45° (but more than 30°) will be the preferred angle between the row direction and the vertical (or corresponding) direction, which in a rectangular array is identical to the angle between the column direction and the horizontal (or corresponding) direction indicated in FIG. 10.

Also, as will be shown below, it is not always necessary to calculate all possible virtual pixel values; rather, it often suffices to employ the values of primary and secondary virtual pixel lines in the calculations. This is particularly advantageous where a fast read-out time is important, e.g. if an auto-focus procedure is working by recognition of the bar code. In such a case, where the object is more distant than the shortest possible distance, not the full lengths of the detector rows and columns are used, and the readout window of the sensor is decreased. This results in a smaller minimum read-out time, and an increased ratio of the longest to the shortest exposure time, accordingly.

The set of values for each virtual pixel, or at least for the diagonal virtual pixel line and the nearest secondary virtual pixel lines, may be subjected to an exemplary weighting scheme as follows:

If (n mod 4)=0: $AD_n = \frac{1}{2} \cdot (AV_{n/4,n/4-1} + AV_{n/4-1,n/4})$;

if (n mod 4)=1: $AD_n = \frac{3}{4} \cdot \frac{3}{4} \cdot \frac{1}{2} \cdot AV_{(n-5)/4,((n-5)/4)+1} +$ $\frac{1}{4} \cdot \frac{3}{4} \cdot \frac{1}{2} \cdot AV_{(n-5)/4,((n-5)/4)+2} +$ $\frac{3}{4} \cdot \frac{3}{4} \cdot \frac{1}{2} \cdot AV_{((n-5)/4)+1,((n-5)/4)} +$ $\frac{1}{4} \cdot \frac{3}{4} \cdot AV_{((n-5)/4)+1,((n-5)/4)+1} +$ $\frac{1}{4} \cdot \frac{1}{4} \cdot \frac{1}{2} \cdot AV_{((n-5)/4)+1,((n-5)/4)+2} +$ $\frac{1}{4}\cdot\frac{3}{4}\cdot\frac{1}{2}\cdot AV_{((n-5)/4)+2,(n-5)/4}+$ $\frac{1}{4}\cdot\frac{1}{4}\cdot\frac{1}{2}\cdot AV_{((n-5)/4)+2,((n-5)/4)+1};$ if $(n \bmod 4)=2: AD_n=AV_{(n-2)/4,(n-2)/4};$ if $(n \bmod 4)=3: AD_n=\frac{1}{4}\cdot\frac{1}{4}\cdot\frac{1}{2}\cdot AV_{(n-7)/4,((n-7)/4)+1}+$ $\frac{1}{4}\cdot\frac{3}{4}\cdot\frac{1}{2}\cdot AV_{(n-7)/4,((n-7)/4)+2}+$ $\frac{1}{4}\cdot\frac{1}{4}\cdot\frac{1}{2}\cdot AV_{((n-7)/4)+1,((n-7)/4)}+$ $\frac{1}{4}\cdot\frac{3}{4}\cdot AV_{((n-7)/4)+1,((n-7)/4)+1}+$ $\frac{3}{4}\cdot\frac{3}{4}\cdot\frac{1}{2}\cdot AV_{((n-7)/4)+1,((n-7)/4)+2}+$ $\frac{1}{4}\cdot\frac{3}{4}\cdot\frac{1}{2}\cdot AV_{((n-7)/4)+2,(n-7)/4}+$ $\frac{3}{4}\cdot\frac{3}{4}\cdot\frac{1}{2}\cdot AV_{((n-7)/4)+2,((n-7)/4)+1}.$ Herein, n runs from 4 onwards; $AD_n$ are the weighted virtual pixel data; and $AV_{x,y}$ are the virtual pixel values. The series of numbers $AD_n$ may then be subjected to further processing as usual. Note that the sum of weighting coefficients in each case is 1. It is preferable to use fixed-point numbers in the calculations. Incidentally, the expression (a mod b) denotes the remainder of the division a/b, while INT(a/b) denotes the integer number which is the result of [a−(a mod b)]/b, where a and b are positive.

In the above manner, coefficients are calculated with which the actual intensity values AP as detected by the actual detectors will be weighted. It may be noted that this scheme results in more (virtual) pixel values $AD_n$ along the detector diagonal than there were actual values $AP_{x,x}$; in other words, an increase in resolution results. At the same time, because of several distinct physical pixel being used in the calculation of the pixel values $AD_n$, a manufacturing imbalance of the pixels always present tends to cancel out.

It should be noted that other weighting schemes with fewer virtual pixel values are also conceivable: E.g., in an alternative scheme, only virtual pixel values from the primary and the first secondary pixel line are used. In a still further simplified scheme, only the values of the primary pixel line of the virtual pixels are used. In these alternatives, however, the increase in resolution is less pronounced than in the full scheme using also the second secondary pixel line. In yet another scheme, a rectangular array is oriented at about 45° to the projected vertical direction, but only that square sub-array of detectors is actually read out or used in the calculation onto whose diagonal the object's vertical axis is projected.

Figure 11:
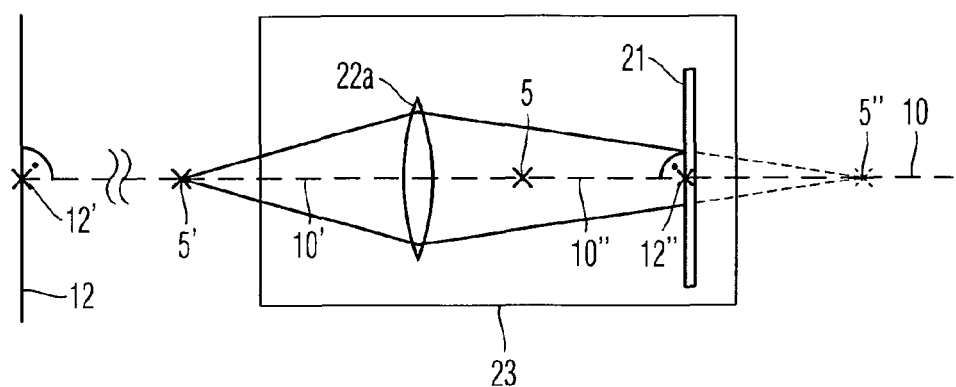
FIG. 11 shows schematically the relative locations of the objective, the image plane, and two vertical axes (indicated by crosses) in a top view.

A top view scheme of the arrangement of various optical components is given in FIG. 11: The optical axis 10 of the objective 22a has a first part 10' intersecting an object plane 12, and a second part 10" intersecting an image plane, where the detector 21 is located. Note that lenses of the imaging optics used for focusing have been omitted in this schematic drawing for increased clarity. The objective may be moved around vertical axis 5 for leveling purposes, e.g. for locating the leveling staff (not shown). Another, auxiliary vertical axis 5' parallel to the swiveling axis 5 intersects the first part 10' of the optical axis 10. This axis 5' is imaged by the optical system to a position 5" behind the image plane (provided the auxiliary vertical axis 5' intersects the optical axis 10 at a position between the object plane 12 and the focal point of the telescope). The imaged axis 5" and the second part 10" of the optical axis 10 define a plane, which in the top view of FIG. 11 is a line coinciding with the second part 10" of the optical axis 10. At the point of intersection with the image plane, a right angle is formed. On the other hand, the vertical axis 5' and the first part 10' of the optical axis 10 also define a plane, which in the top view of FIG. 11 is a line coinciding with the first part 10' of the optical axis 10. This plane forms a right angle with the object plane 12. It will be appreciated that the lines of intersection of the planes defined by vertical axes 5' or 5" with the first or second part, respectively, of the optical axis 10, with the image plane or object plane 12, respectively, are all vertical in this example, or at least they all correspond optically. E.g., if the second part 10" of the optical axis 10 is made to form an angle with the first part 10' of the optical axis 10 by insertion of a mirror (such as beam splitter 26 in FIG. 1), the image 5" of the vertical axis 5' may not be vertical; yet it will correspond optically to the vertical axis 5', of which it is the optical image. At the same time, a vertical axis 12' of the object will be imaged onto the image plane to form an image 12" of the object's vertical axis 12'.

It is understood that the vertical axis 5 may intersect the optical axis 10. Typically, the point of intersection is near to, or coincides with the device's anallactic point.

It is evident for the skilled person that the present invention is not limited to the above-described use of stepper motors. Any other known actuator adapted to move the telescope 2 and the camera 3 around the fixed vertical axis 5, or to vary the distance D between the objective 22a and the object plane 12 may be used instead. For example, an optical lens having a variable refraction might be used instead of the focusing stepper motor and the displaceable one of the optical lenses of the optical system.

Moreover, it is evident for the skilled person that both the size and kind of the optical detectors used as the two-dimensional detector 21 and as array CCD-detector 31 can be varied. Furthermore, the detectors can either be color or black-and-white detectors. It is contemplated that a two-dimensional color detector be used: In this case, the particular interpolation scheme allows for considerable balancing of color inhomogeneities.

In place of the two-dimensional detector with aspect ratio of 4:3 or 3:2 as described above, it is conceivable to use one with relatively few, relatively long rows, i.e. with an aspect ratio of (much) larger than 2:1, but with staggered rows. Such a detector may be arranged with the row direction along the image of the vertical object axis (i.e., $\phi=0$), and still provide for resolution enhancement, as compared to a line detector with non-staggered rows. The weighting scheme as described above may be used with such a sensor, the staggered rows taking the place of the primary and secondary pixel lines, respectively.

Further, although the invention has been described in the above as a leveling device, the principles set forward can also be employed in a surveying apparatus.

Also, where noise is not an issue, it is conceivable not to apply a weighting scheme for calculating averaged signal values, but to instead exploit the slightly different vertical positions of the individual detectors when the detector array is tilted at an acute angle with respect to an image of a vertical object axis. In some instances, this may allow for an increased accuracy in the determination of the position and width of the code bars on the level staff.

Embodiments of a leveling apparatus for optically measuring a height difference relative to a leveling staff comprise an objective lens, a detector array arranged in an image plane of the objective lens, a mount for moving said objective lens around a fixed vertical axis of the apparatus, and a processor. The detector array has rows inclined to an image of a vertical object axis at an acute angle. It is preferable for the detectors of any one row not to have sizeable gaps between them.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A leveling instrument comprising:
an objective lens having an optical axis, an object plane intersecting the optical axis, and an image plane intersecting the optical axis, wherein the objective lens is configured to image an object disposed in the object plane into the image plane;
an image receiving unit comprising at least six rows of at least eight light detectors each, the at least six rows of at least eight light detectors being arranged to form a two-dimensional detector array, the light detectors being adapted for outputting signals representing an amount of light being incident on the light detectors, wherein the image receiving unit is arranged in the image plane;
a mount for moving the objective lens about a vertical axis of the mount; and
at least one processor adapted to determine a vertical position of the object using weighting coefficients to calculate weighted values from the signals outputted from selected ones of the light detectors, where the weighting coefficients for each of the selected ones of the light detectors depend on a lateral distance of each corresponding light detector from a diagonal of the two-dimensional detector array,
wherein the two-dimensional detector array is arranged at an acute angle with respect to an image of a vertical axis of the object when the optical axis is arranged perpendicular to the vertical axis of the mount, said image of the vertical axis of the object being generated by the objective lens, the vertical axis of the object being parallel to the vertical axis of the mount.

2. The leveling instrument according to claim 1, wherein the mount includes a swiveling arrangement for swiveling the objective lens and the image receiving unit about the vertical axis of the mount.

3. The leveling instrument according to claim 1, wherein the acute angle is at least one of more than 10° and less than 80° or more than 32° and less than 58°.

4. The leveling instrument according to claim 3, wherein the acute angle is more than 40° and less than 50°.

5. The leveling instrument according to claim 4, wherein a number of the rows of detectors equals a number of the light detectors in each row.

6. The leveling instrument according to claim 1, wherein a number of the rows is less than a number of the light detectors in a longest one of the rows.

7. The leveling instrument according to claim 1, further comprising at least one processor adapted to calculate weighted average signals from the output signals of the light detectors of adjacent ones of the rows.

8. The leveling instrument according to claim 7, further comprising a memory for storing output data of the at least one processor.

9. The leveling instrument according to claim 7, further comprising a display for displaying output data provided by the at least one processor.

10. The leveling instrument according to claim 1, further comprising an actuator for moving the objective lens and the image receiving unit around the vertical axis of the mount.

11. The leveling instrument according to claim 1, further comprising a tilt sensor for detecting an angle of the optical axis with respect to a plane perpendicular to the vertical axis of the mount.

12. The leveling instrument according to claim 1, further comprising at least one reflector arranged between the objective lens and the light detectors.

13. The leveling instrument according to claim 1, wherein the objective lens provides a fixed magnification.

14. The leveling instrument according to claim 1, wherein the objective lens is part of a telescope.

15. Use of the leveling instrument according to claim 1 in a geodetic measurement process in which the device is initially leveled.

16. The use according to claim 15, wherein at least one processor is used for providing data as an input for an image recognition step forming part of the geodetic measurement process.

17. The use according to claim 16, wherein the object is a bar code of a machine-readable scale of a leveling staff.

18. A method of detecting a vertical position of an object, the method comprising:
moving an objective lens and a detector array comprising at least six rows of at least eight light detectors each about a first vertical axis so as to be oriented towards the object;
imaging the object with the objective lens onto the detector array, such that an image of a second vertical axis of the object forms an acute angle with respect to a direction of extension of the detector array when the first vertical axis and the second vertical axis of the object are oriented in parallel;
generating data corresponding to intensities of light incident on the light detectors; and
calculating weighted sums of data corresponding to intensities of light incident on selected ones of the light detectors, where for each of the selected ones of the light detectors, the weighted sums are calculated using weighting coefficients that depend on a lateral distance of each corresponding light detector from a diagonal of the detector array.

19. The method according to claim 18, further comprising displaying an array of image elements representing the weighted sums of data.

20. The method according to claim 18, further comprising subjecting the weighted sums of data to image recognition.

21. The method according to claim 18, wherein the acute angle is more than 10° and less than 80°.

22. The method according to claim 21, wherein the acute angle is more than 30° and less than 60°.

23. The method according to claim 22, wherein the acute angle is more than 40° and less than 50°.

24. The method according to claim 18, comprising adjusting the objective lens such that the image of the vertical axis of the object is aligned with a diagonal of the light detector array.

25. A method of detecting a vertical position of an object, the method comprising:
moving an objective lens and a detector array comprising plural rows of light detectors about a vertical axis so as to be oriented towards the object;
imaging the object with the objective lens onto the detector array, such that an image of a vertical axis of the object forms an acute angle with respect to a direction of extension of the plural rows of light detectors;
generating data corresponding to intensities of light incident on the light detectors;
calculating weighted sums of data corresponding to intensities of light incident on selected ones of the light detectors,
adjusting the objective lens such that the image of the vertical axis of the object is aligned with a diagonal of the light detector array,
wherein weighting coefficients of the weighted sums of data depend on a lateral distance of the respective light detectors from the diagonal of the light detector array.

26. The method according to claim 25, wherein the weighting coefficients are smaller, the greater the lateral distance of the respective light detector from the diagonal.

27. The method according to claim 25, wherein the weighting coefficients of those detectors whose lateral distance from the diagonal is more than their lateral size are zero.

28. The method according to claim 25, wherein the weighting coefficients of those light detectors intersected by the diagonal of the detector array, are larger than the weighting coefficients of those light detectors adjacent the light detectors intersected by the diagonal of the detector array, but not themselves intersected by the diagonal of the detector array.

29. The method according to claim 25, further comprising calculating more weighted sums of data for each image than the number of light detector signals entering in the calculation.

\* \* \* \* \*